United States Patent [19]

Goeft et al.

[11] 4,371,049
[45] Feb. 1, 1983

[54] STEERING AXLE

[75] Inventors: Manfred Goeft; Dieter Maurer, both of Friedrichshafen, Fed. Rep. of Germany

[73] Assignee: Zahnradfabrik Friedrichshafen A.G., Friedrichshafen, Fed. Rep. of Germany

[21] Appl. No.: 154,919

[22] Filed: May 30, 1980

[30] Foreign Application Priority Data

Jun. 2, 1979 [DE] Fed. Rep. of Germany ....... 2922660

[51] Int. Cl.³ .............................................. F16H 3/44
[52] U.S. Cl. ..................................... 180/255; 74/785; 180/260; 464/145
[58] Field of Search ............... 180/254, 255, 256, 257, 180/258, 259, 260, 261, 262, 263, 785; 74/801, 802, 803; 64/21, 22

[56] References Cited

U.S. PATENT DOCUMENTS

| | | | |
|---|---|---|---|
| 1,676,322 | 7/1928 | Chilton | 180/258 |
| 2,362,456 | 11/1944 | Alden | 180/254 |
| 2,503,477 | 4/1950 | Gregory | 180/256 |
| 2,801,702 | 8/1957 | Armington | 180/255 |
| 2,858,897 | 11/1958 | Sibley | 180/255 |
| 3,227,237 | 1/1966 | Moreno et al. | 180/255 |
| 3,253,670 | 5/1966 | Thomas et al. | 180/254 |
| 4,091,688 | 5/1978 | Huffman | 74/785 |

FOREIGN PATENT DOCUMENTS 503835  4/1939  United Kingdom .

Primary Examiner—Joseph F. Peters, Jr.
Assistant Examiner—Randall A. Schrecengost
Attorney, Agent, or Firm—Lyon & Lyon

[57] ABSTRACT

A steering axle comprises a steering shaft connected to a wheelhub either directly or through a planetary gear set, and to a shaft joint. The shaft joint includes an external component which is connected to a driven shaft. A boot is affixed to the steering shaft and the external component and collectively with the external component encloses the shaft joint. There is a housing about the shaft joint and affixed to the shafts such that when the shafts are located transversely relative to each other the boot and joint can be laterally removed. A plug in the wheelhub axially locates the steering shaft, and permits withdrawal of the steering shaft.

14 Claims, 2 Drawing Figures

STEERING AXLE

BACKGROUND

This invention relates to a steering axle. In particular the invention is directed to a driven steering axle. The invention concerns shafts for the axle having a wheelhub or a planetary reduction gear in the hub.

Driven steering shafts for axles include shafts with a planetary reduction gear in the wheelhub, and those with a boot partially covering a shaft joint between a driven shaft and the steering shaft.

In known arrangements power is transmitted from a differential outwardly through a driven shaft or axle shaft, and the ends of the driven shaft or axle shaft are inserted into the inwardly facing steering joint component which is in turn securely connected to the steering shaft. The steering shaft drives the wheelhub or the inner gear of a planetary gearbox located within the wheelhub. The shaft joint includes a universal joint, or preferably, a constant velocity joint, when viewed from its greatest diameter towards the wheelhub, and is enclosed in a housing and packed with grease. The seal of the steering shaft is achieved with a boot which is attached at the greatest diameter on the housing for the shaft joint and at its smallest diameter on the steering shaft.

This arrangement has the disadvantage in that the relatively well protected side of the shaft joint, namely, the side facing the wheelhub, is in a housing, while the boot, which extends in a direction towards the vehicle center of the vehicle, is relatively unprotected and is consequently susceptible to damage under severe operating conditions.

Considerable labor is required to replace the boot which is normally constructed of rubber, and which is no longer serviceable due to damage or age. The same problems arise when a universal joint or a constant velocity joint requires replacement. In both cases the wheel, wheelhub, and the entire steering housing must be removed before the steering shaft with the shaft joint or even the boot can be replaced. When the small diameter end of the boot is reattached to the shaft, the entire steering shaft must be removed. Furthermore, in the case of a planetary steering shaft, the oil needs to be drained and the entire planetary unit has to be removed.

In view of this there is a need to provide a steering axle, especially for a planetary steering shaft, which minimizes the above disadvantages, and which protects the boot from external damage and which requires reduced effort for replacing the boot or the shaft joint.

SUMMARY OF THE INVENTION

A steering axle includes a steering shaft adapted to be drivingly connected with wheel receiving means. There is also a shaft joint adapted to be separably connected with a driven shaft, a housing on the side of the shaft joint adapted for connection with the driven shaft and boot means. Means on the housing and the steering shaft is adapted to receive the boot means. The housing and the boot means collectively substantially enclose the shaft joint.

DRAWINGS

The invention is further described with reference to the accompanying drawings, which are:

FIG. 1 a cross-sectional side view of a steering axle with a planetary reduction gear in the wheelhub.

FIG. 2 a cross-sectional plan view from above of a shaft joint of a driven steering axle at full steering lock.

DETAILED DESCRIPTION OF DRAWINGS

Figure 1:
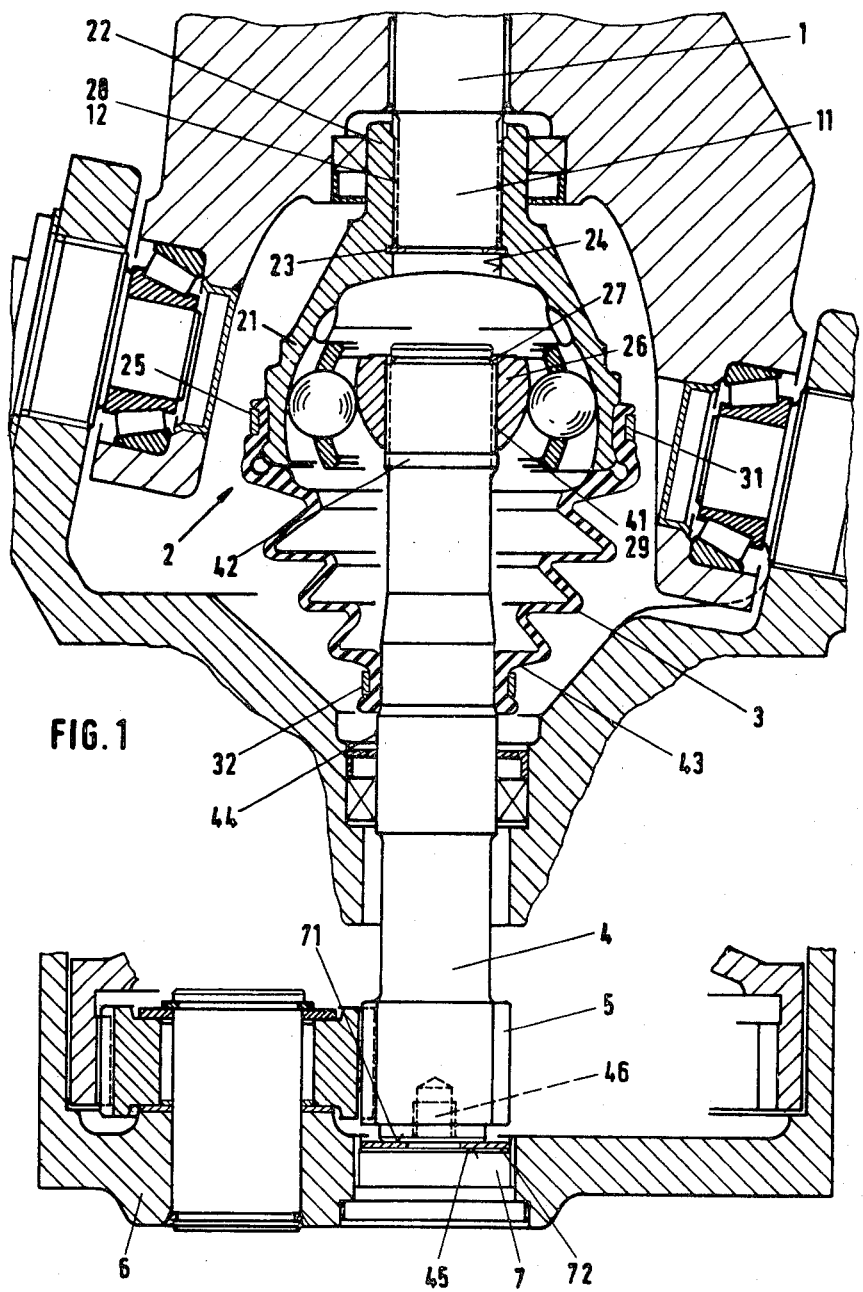

FIG. 1 shows a driven shaft 1 leading from a differential or transfer case, the driven shaft 1 being fitted with a splined end 12. A shaft joint 2, being a constant velocity joint is splined 29 on the inside of neck 22 of a joint housing formed by a bell-shaped external component 21 of a universal joint so as to mate with the end 12 of driven shaft 1. A ring 23 is fitted to the inside of the external component of the shaft joint 2 to locate the driven shaft 1 axially. The bell-shaped external component 21 of the shaft joint 2 encloses an inner component 26 of the shaft joint 2. The external component 21 provides a groove 25 at its greatest diameter to permit the attachment of a boot 3 with a hose clamp 31 to the external component 21. The inner component 26 of the constant velocity joint 2 has an internally splined end 28 into which a splined end 41 of the steering shaft 4 fits. There is also a ring or collar 42 for axial location of the steering shaft 4 relative to the inner component 26.

The steering shaft 4 provides two cylindrical sealing surfaces 43 and 44 located near the center of its length. Surface 44 is for the oil seal in the wheelhub gear assembly and surface 43 is for the attachment of the boot 3 with a hose clamp 32. The diameter of surfaces 43 and 44 is equal to or greater than the overall diameter of the steering shaft end 41. In this particular example, the steering shaft 4 is in direct mesh with a wheel receiving means which is an inner gear 51 of the planetary gear set 5. A clutch arrangement of some sort can of course be fitted here. In either case the diameter of this gear 5 is equal to or greater than the diameter of the sealing surfaces 43 and 44. In this fashion, the shaft 4 is machined such that the bearing and sealing surfaces 5, 43 and 44 respectively have decreasing diameter toward the shaft joint 2, the largest diameter being the outer diameter 5.

The steering shaft 4 in this embodiment has withdrawal means being a threaded hole 46 in the end 45 of the steering shaft 4 to facilitate easier removal of the shaft 4.

A plug 7 which is preferably a threaded plug is located in the wheel receiving means being a wheelhub 6 which also acts as a planetary gear carrier unit has several functions. These are that the plug 7 axially locates the steering shaft 4 and shaft joint 2; plug 7 provides a seal to an opening through which the steering shaft 4 can be extracted; and the plug 7 functions as an oil filler neck.

A bearing washer 72 can be attached to the inward facing surface 71 of the plug 7, as the steering shaft 4 and wheelhub 6 and thus also the plug 7 would be subject to different rates of rotation.

Figure 2:
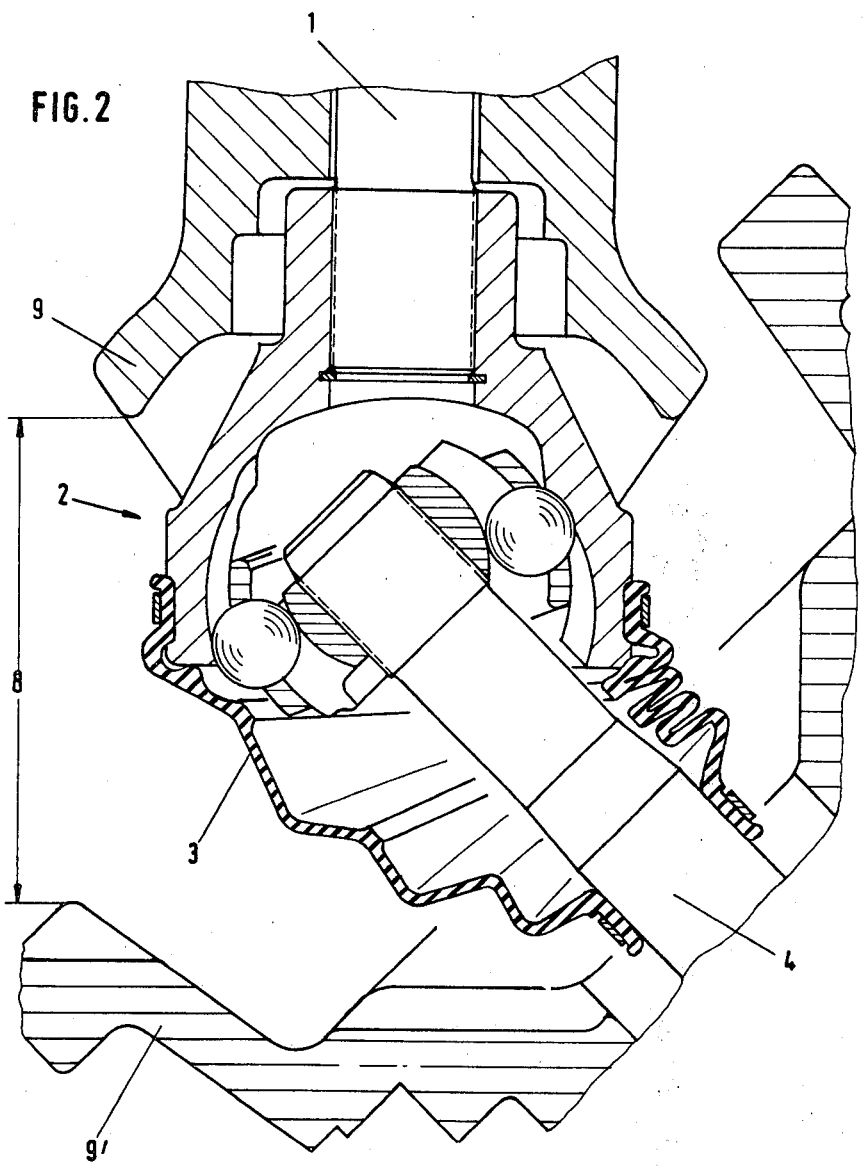

The constant velocity joint 2 with the attached boot 3 is shown in FIG. 2 with the steering shaft at full steering lock. The steering shaft 4 can be withdrawn as has been described through the plug 7 without the need to drain oil from the planetary gear set 5 in the wheelhub to the shaft joint 2 and the boot 3 can be extracted through the opening 8 between steering housing means formed by a stationary honoring component 9 and a movable housing component 9¹, both of which housing components 9 and 9¹ normally enclose the universal joint or constant velocity joint 2. The boot 3 is thereby collapsed and covers the exterior face of the constant velocity joint 2. In this manner the boot 3 and shaft joint 2 are laterally removable.

In another embodiment of the invention the steering shaft 4 is mounted in the wheelhub 6 in an axially secured manner, or is attached to the face of the wheelhub 6.

With the removal of one of the plugs 7 located on the face 45 of the wheelhub 6 and the loosening of the boot fastener 3 on the steering shaft 4, the entire steering shaft 4 can simply be extracted through this opening. With the steering at full lock, the boot 3 as well as the shaft joint 2 is accessible and can be removed and replaced individually or as a unit. The removal of the boot 3 is achieved through the loosening of the clamp 32 on the joint housing. The shaft joint 2 is simply pulled off the driven shaft 1 and removed laterally. During removal as a unit, the boot 3 is merely collapsed and the shaft joint 2 is pulled off from the driven shaft 1. The reinstallation is the reverse of removal and due to the simple procedure, the joint can be repacked with grease in either the removed or the installed position.

As a result of the boot 3 being situated towards the wheelhub 6, the steering housing 9 and $9^1$ offers much better protection and consequently the risk of damage is greatly reduced.

The arrangement of the driven steering shaft 4 enables the same size boot 3 and shaft joint 2 to be used for various applications. Track changes can be accommodated at the driven shaft 1 while location on a hub, either through a direct drive or a planetary reduction gear, is adjustable accordingly at the steering shaft 4.

The plug 7 in the wheelhub 6, which axially locates the steering shaft 4 as well as the shaft joint 2 can simultaneously be used advantageously as an oil filler neck.

The boring and threading on the inside face 45 of the steering shaft 4 permits a simple removal of the steering shaft 4 and thereby yields a more efficient arrangement.

The present embodiments of the invention are to be considered in all respects as illustrative and not restrictive to the scope of the invention.

We claim:

1. A steering axle comprising a steering shaft adapted to be drivingly connected with means for receiving a wheel; a shaft joint adapted to separably connect the steering shaft with a driven shaft; a joint housing for the shaft joint, said joint housing including a bell-shaped component and boot means, the bell shaped component and boot means collectively enclosing the shaft joint; steering housing means about the bell shaped component and boot means, said steering housing means having relatively movable housing components, there being an aperture between the housing components when the steering shaft is located at least at a predetermined transverse angle relative to the driven shaft, such aperture being sufficiently large to permit the shaft joint and boot means to be removed apart from the driven shaft, each of the steering shaft, the shaft joint and the boot means being removable apart from each other and from the driven shaft while the driven shaft and wheel receiving means remain substantially in position.

2. A steering axle as claimed in claim 1 wherein the steering shaft provides surfaces towards the shaft joint having a diameter no greater than the diameter of the surface adapted to be drivingly connected with the wheel receiving means, and wherein the wheel receiving means includes a wheelhub and an opening in the hub for receiving the shaft, and plug means attached to the wheelhub for axially locating the steering shaft, removal of the steering shaft being effected axially through the opening in wheelhub on removal of the plug means.

3. A steering axle as claimed in claim 2 wherein the wheel receiving means includes a planetary gear set, the steering shaft being directly connected to the inner gear of the planetary gear set.

4. A steering axle as claimed in claim 3 wherein the plug means closes the opening in the wheel hub, the opening in the hub having a diameter substantially equal to the steering shaft diameter, and the wheel hub acts as a carrier unit for the planetary gear set such that the removal of the plug means is effected without the need for draining of oil from the planetary gear set.

5. A steering axle as claimed in claim 4 wherein the plug means permits for oil refill of the planetary gear set.

6. A steering axle as claimed in any of claim 1, claim 4 or claim 5 wherein the inner gear set and the steering shaft are an integral unit.

7. A steering axle as claimed in anyone of claims 1 to 5 wherein the steering shaft includes withdrawal means to facilitate removal of the shaft through the wheel receiving means.

8. A steering axle as claimed in claim 7 wherein the steering shaft includes an end face adapted for location in the wheel receiving means, and the withdrawal means includes a threaded aperture in the end face.

9. A steering axle as claimed in anyone of claims 2 to 5 including a bearing washer between the plug means and the end of the steering shaft.

10. A steering axle as claimed in claim 2 wherein the driven shaft and the shaft joint are drivingly connected through a spliced joint, and including ring means between the driven shaft and the shaft joint for axially locating the shaft joint and the driven shaft.

11. A steering axle as claimed in claim 10 wherein the steering shaft and the shaft joint are drivingly connected through a spliced joint, and including collar means for axially locating the steering shaft and shaft joint.

12. A steering axle as claimed in claim 2 wherein the boot means includes ends adapted to be separably affixed to the bell-shaped component and steering shaft with hose clamps.

13. A steering axle comprising a steering shaft drivingly connected with a driven shaft; the shaft joint having a joint housing with a bell shaped component on the side of the joint adapted for connection with the driven shaft, and boot means adapted for connection with the steering shaft, the housing and the boot collectively enclosing the shaft joint, the shaft joint being a universal joint or constant velocity joint, and a steering housing about the housing on the joint and the boot means, such steering housing including a stationary component affixed to the driven shaft and a component affixed to the steering shaft and movably with the steering shaft, such that between the component an aperture is formed in the steering housing at least when the steering shaft is located at a predetermined transverse angle relative to the driven shaft, and the shaft joint, steering shaft, and boot means separably being removable without removal of the driven shaft.

14. A steering axle comprising a steering shaft adapted to be drivingly connected with wheel receiving means, including a wheel hub; a shaft joint separably connected with a driven shaft; a joint housing for the shaft joint, such joint housing including a solid component on the side of the shaft joint adapted for connection with driven shaft, and collapsible boot means on the side of the shaft joint adapted for connection with the steering shaft, the joint housing and the boot means collectively substantially enclosing the shaft joint, and the joint housing for the shaft joint including an external joint component, the solid joint component having a neck adapted to be drivingly connected with the driven shaft; the steering shaft providing surfaces having a diameter no greater than the diameter of the surface adapted to be drivingly connected with the wheel receiving means; a steering housing about the housing on the joint and the boot means, such steering housing including a stationary component affixed to the driven shaft and a component affixed to the steering shaft and movable with the steering shaft such that between the components an aperture is formed in the steering housing, an opening in the wheel hub; and plug means for location in the opening for axially locating the steering means for location in the opening for axially locating the steering shaft, removal of the plug from the opening in the wheel hub permitting axial withdrawal of the steering shaft through the opening without the need for draining of oil from the wheel receiving means, and the shaft joint being removable from the driven shaft while the driven shaft remains substantially in position.

* * * * *